United States Patent
Badt, Jr.

(10) Patent No.: US 9,918,123 B2
(45) Date of Patent: Mar. 13, 2018

(54) THWARTING REMOVAL OF A COMMERCIAL IN AN IPTV NETWORK

(75) Inventor: Sig Harold Badt, Jr., Richardson, TX (US)

(73) Assignee: Alcatel Lucent, Boulogne-Billancourt (FR)

(*) Notice: Subject to any disclaimer, the term of this patent is extended or adjusted under 35 U.S.C. 154(b) by 1621 days.

(21) Appl. No.: 11/941,082

(22) Filed: Nov. 16, 2007

(65) Prior Publication Data
US 2009/0133052 A1 May 21, 2009

(51) Int. Cl.
| | |
|---|---|
| H04H 60/32 | (2008.01) |
| H04N 7/10 | (2006.01) |
| H04N 7/025 | (2006.01) |
| H04N 21/44 | (2011.01) |
| H04N 21/234 | (2011.01) |
| H04N 21/643 | (2011.01) |
| H04N 21/81 | (2011.01) |

(52) U.S. Cl.
CPC . *H04N 21/44016* (2013.01); *H04N 21/23424* (2013.01); *H04N 21/64322* (2013.01); *H04N 21/812* (2013.01)

(58) Field of Classification Search
CPC .......... H04N 21/234; H04N 21/23418; H04N 21/23424; H04N 21/432; H04N 21/44; H04N 21/44008; H04N 21/44016

USPC ..................................................... 725/32, 19
See application file for complete search history.

(56) References Cited

U.S. PATENT DOCUMENTS

| | | | | |
|---|---|---|---|---|
| 7,280,737 | B2 * | 10/2007 | Smith | 386/46 |
| 8,254,756 | B2 * | 8/2012 | Quan et al. | 386/251 |
| 2002/0087975 | A1 * | 7/2002 | Schlack | H04H 20/10 |
| | | | | 725/34 |
| 2003/0001977 | A1 * | 1/2003 | Wang | 348/700 |
| 2003/0192060 | A1 * | 10/2003 | Levy | 725/133 |
| 2003/0206596 | A1 * | 11/2003 | Carver et al. | 375/240.26 |
| 2005/0185919 | A1 * | 8/2005 | Smith | 386/46 |
| 2006/0101486 | A1 * | 5/2006 | Kar et al. | 725/32 |
| 2006/0248569 | A1 * | 11/2006 | Lienhart et al. | 725/135 |
| 2007/0055984 | A1 * | 3/2007 | Schiller et al. | 725/32 |
| 2010/0158358 | A1 * | 6/2010 | Lienhart et al. | 382/162 |

* cited by examiner

*Primary Examiner* — Kyu Chae
(74) *Attorney, Agent, or Firm* — RGIP LLC (57) ABSTRACT

In an IPTV network, a program content stream is processed to create an artifact detectable by a commercial remover in a program content portion of the program content stream. The artifact may be created by splicing first and second portions of program content together such that the artifact appears in the program content. A commercial remover processing the resultant program content stream erroneously removes portions of program content or leaves portions containing commercial content in the program content stream.

22 Claims, 5 Drawing Sheets

THWARTING REMOVAL OF A COMMERCIAL IN AN IPTV NETWORK

FIELD OF THE INVENTION

This disclosure relates to providing a program content stream to a user on a network. More particularly, the invention relates to providing commercial content in a program content stream on an IPTV network in a manner to thwart a commercial remover.

BACKGROUND OF THE INVENTION

Internet Protocol TeleVision (IPTV) is a technology that can be used to distribute Broadcast TV (BTV) content using a combination of IP multicast networks and DSL or fiber optic access links. As described herein, a content stream delivered to a user will typically include both program content portions and non-program content portions, such as commercials. One of the advantages of IPTV is that it can do customized commercial insertion. This means that two viewers watching the same program can receive different commercial content. This gives broadcasters the ability to do targeted advertising.

One of the concerns regarding commercial insertion is that it leaves artifacts in the data stream delivered to the Set Top Box (STB). These artifacts can be detected by an automatic device that is referred to herein as a "commercial remover."

A commercial remover is a device that processes the delivered content stream and removes the non-program content, leaving only the program content to be viewed by the user. Most typically, a commercial remover looks for artifacts in the program content stream that denote a boundary between program content and commercial content portions. Such artifacts can occur where the commercial content is spliced into and out of the program content stream.

A commercial remover detects the starts and ends of the commercials and separates the commercials from the program content. The commercial remover stores the program content without the commercials on a recording device. The user can then view the program stripped of its commercials at a later time. This is a concern to content providers and network operators as it can potentially devalue the placement of commercial content, thereby depriving the content provider of income to which they are entitled.

Not every scheme for doing commercial insertion leaves artifacts in the data stream delivered to the STB. The schemes that do not leave artifacts involve inserting commercials at the application protocol layer. They decode and re-encode the compressed video streams for both the program and the commercial. However, these schemes prevent the ability for targeted advertising. In addition, these technologies are expensive and do not scale well. They have particular difficulty when a large number of different commercials are inserted into the same place in the same program, for example, for viewer tailored advertising.

SUMMARY OF THE INVENTION

The present invention overcomes the abovementioned disadvantages by inserting spurious commercials into a program. The purpose of the spurious commercials is to thwart the commercial removers. Thwarting the commercial can include, without limitation, causing the commercial remover to leave in the commercial content of a program content stream. Thwarting the commercial remover can also include causing the commercial remover to remove desired program content, such as portions of a TV program, so that the viewer no-longer desires to use the commercial remover.

In one embodiment of the disclosure, a method of processing a program content stream carrying at least a portion of a program comprises creating at least one detectable artifact in a program content portion of the program content stream. The detectable artifact appears as spurious or fake commercial when the program content stream is processed by a commercial remover.

In one embodiment of the disclosure, from a protocol point of view, a spurious commercial looks like a real commercial, yet from a viewer's point of view, it is an undetectable segment in the non-commercial part of a program. A commercial remover thinks a spurious commercial is a real commercial and erroneously removes a portion from a part of a program the viewer wants to see.

Real commercials usually have standardized lengths. For example, some typical commercial lengths are ten seconds, thirty seconds, and one minute. A commercial remover may be able to use knowledge of this fact to distinguish between real and spurious commercials. To counter this, an embodiment of the disclosure combines spurious and real commercials. In a combined commercial, a program content portion contains all or part of a real commercial. This causes real commercials to appear to have non-standard lengths.

In one embodiment of the disclosure, a computer readable medium comprises instructions for processing a program content stream carrying at least a portion of a program, the instructions comprising instructions for creating at least one detectable artifact in a program content portion of the program content stream.

In one embodiment of the disclosure, a network arrangement for providing a program content stream to a user comprises at least one node, a splicer at a first node of the at least one nodes, wherein the splicer receives a first program content stream containing a first program content portion and a second program content stream containing a second program content portion, and wherein the splicer splices said first program content stream with the second program content stream to create a resultant program content stream.

In one embodiment of the disclosure, a spurious commercial is inserted into a program content stream using the same technology that is used to insert real commercials. It is preferred, but not essential, that the commercial insertion scheme does not leave visible or audible defects at the points where a commercial is spliced in and out of a program.

BRIEF DESCRIPTION OF THE DRAWINGS

The invention will now be described with reference to exemplary embodiments in conjunction with the accompanying figures in which.

DETAILED DESCRIPTION OF THE INVENTION

In an Internet Protocol TeleVision (IPTV) network arrangement 10 (FIG. 1), a content stream 11 such as a broadcast television program is delivered using a multicast tree 12. In a multicast tree 12, each packet of the content stream is sent from a program source 14 from node to node one time only. A router or bridge 16 between the program source 14 and the TV sets 18 receives a packet on one input port. If necessary, the router or bridge makes duplicate copies of the packet and sends one copy out on each of several output ports.

Figure 1:
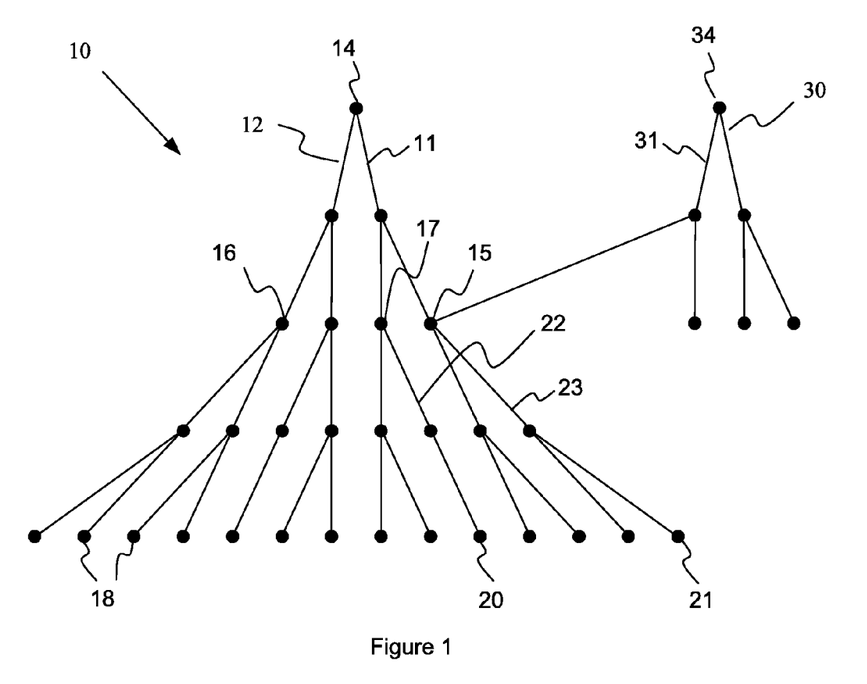
FIG. 1 represents a network arrangement for providing commercial content in a program content stream.
Figure 2:
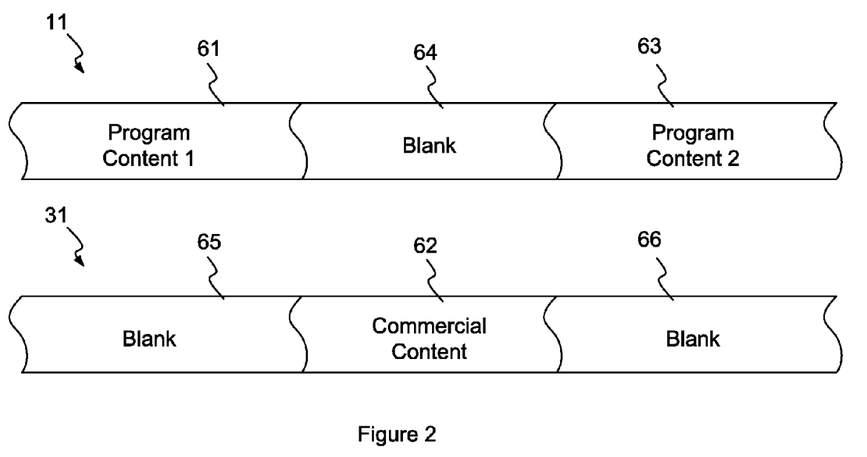
FIG. 2 represents program and commercial content streams prior to splicing.

A TV program may come from a program source 14 with commercials already inserted in it, or the commercials may be inserted somewhere in the network in a known manner. If the program content stream 11 already has the commercials inserted in it, every TV set receives the same commercial. If the network inserts the commercials, different TVs watching the same program may receive different commercials. For example, the network 10 may derive commercial content from a second multicast tree 30 carrying a commercial content stream 31 from commercial source 34. The multicast tree 30 joins the multicast tree 12 at node 15 which may comprise a splicer. FIG. 2 shows the program content stream 11 and commercial content stream 31 prior to splicing. As is well known, the program content stream 11 has first and second program content portions 61, 63 separated by a blank portion 64 allocated for the placement of commercials. The commercial content stream 31 has a commercial content portion 62 between blank content portions 65, 66 synchronized to the allocated portion 64 of the program content stream 11. When it is time for the program content stream 11 to be interrupted by a commercial, a splicer at node 15 in the network "splices" the commercial content stream 31 into the program content stream 11 in a known manner. The resultant content stream 23 shown in FIG. 3 has a first program content portion 61, followed by a commercial content portion 62 and then a second program content portion 63. The resultant content stream 23 is sent downstream of node 15 to be delivered to television sets 21.

Node 17 may derive commercial content from a different multicast tree (not shown) to that of node 15. Therefore, the network 10 can provide targeted advertising since the resultant content stream 22 delivered to television set 20 from node 17 will be have different commercial content to the resultant content stream 23 delivered to television set 21.

Figure 3:
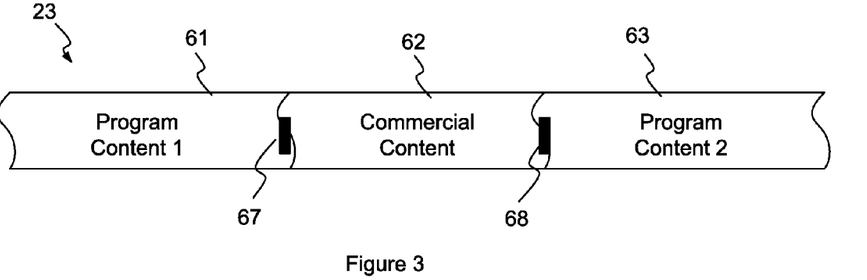
FIG. 3 represent a resultant program content stream after splicing the streams of FIG. 2.
Figure 4:
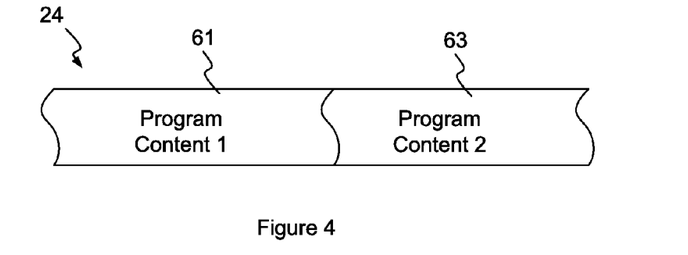
FIG. 4 represents the resultant program content stream after processing by a commercial remover.

The step of splicing in the commercial stream 31 can leave artifacts 67 in the resultant content stream 23 at the join between the first program content portion 61 and the start of the commercial content portion 62. An artifact 68 may also occur in the resultant content stream 23 at the join between the end of the commercial content portion 62 and the second program content portion 63 where the commercial stream 31 is spliced out. Such artifacts may include a visible artifact, such as a fade to black, or may be an audible artifact, such as a sudden change in the audible volume of the content stream. An artifact may also be undetectable by a viewer, but may be detectable by devices which process the content stream. A commercial remover monitors the content stream 23 coming to the TV set. When the commercial remover encounters artifacts 64, 68 in the content stream, the commercial remover considers that a commercial has been found and so removes the commercial content portion 62 from the content stream. A viewer can then view a final content stream 24 (FIG. 4), consisting only of the first and second program content portions 61, 63, for example, without commercial content portion 62.

Figure 5:
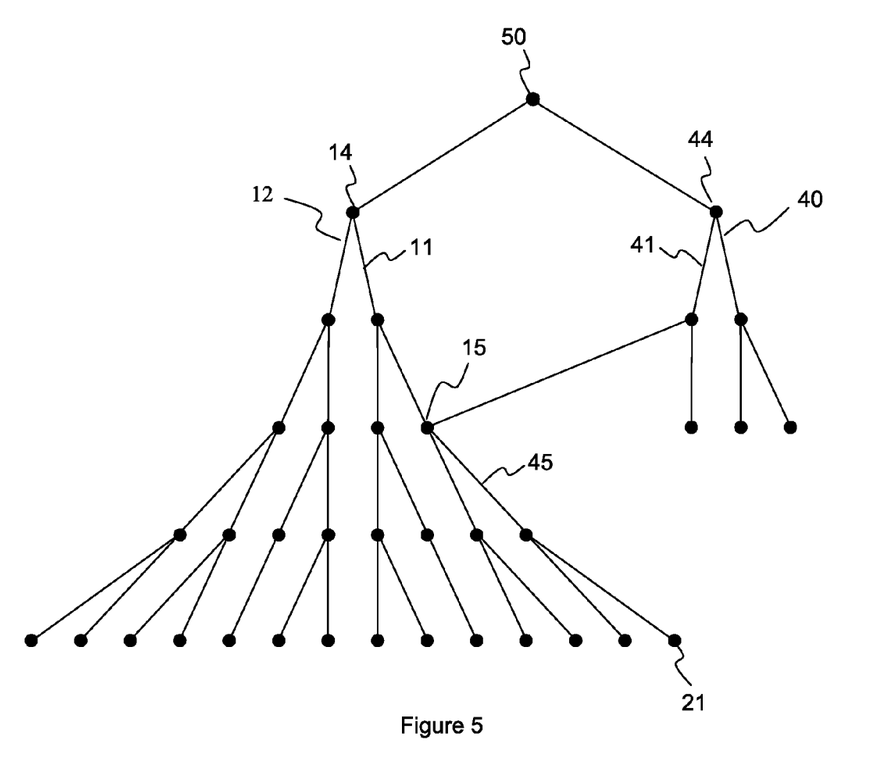
FIG. 5 represents a network arrangement in accordance with an embodiment of the disclosure.
Figure 6:
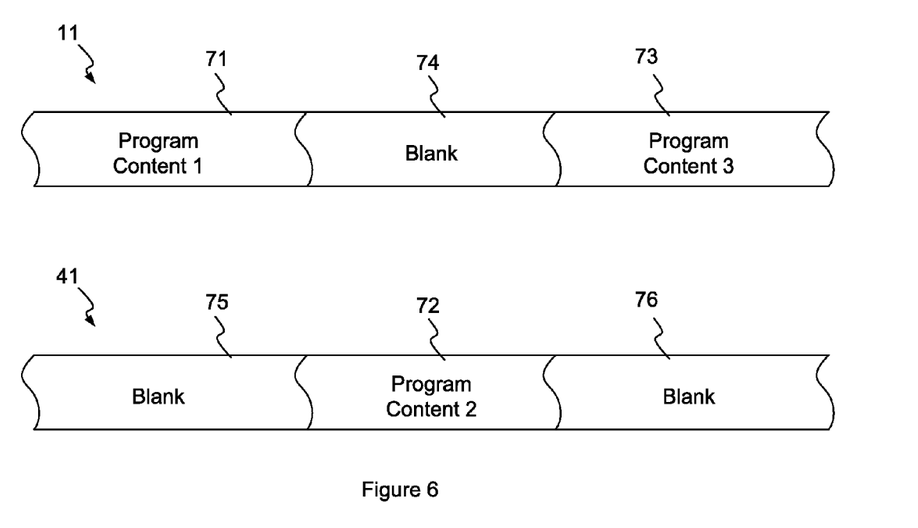
FIG. 6 represents first and second program content streams prior to splicing.

A network arrangement for thwarting a commercial remover in accordance with one embodiment of the invention is depicted in FIG. 5. The network arrangement has two multicast trees 12, 40 that derive respective program content streams 11, 41 from a common program source 50. At program source 50, the program is divided into parallel content streams. As depicted in FIG. 6, the program content stream 11 is created so as to include a first program content portion 71 which includes, for example, the first ten minutes of the program 50. The first program content portion 71 is followed by a blank portion 74 and then a third program content portion 73, such as the third ten minutes of a program. The program content stream 41 includes, for example, a second program content portion 72, such as the second ten minutes of the program 50 interspersed between two blank portions 75, 76. After the program has been running for ten minutes, the two streams are spliced together at splicer node 15 in the same way as described above for splicing in a commercial content stream. The resultant content stream 45 (FIG. 7) has a first program content portion 71, for example, the first ten minutes, joined to a second program content portion 72, for example, the second ten minutes, which is in turn joined to a third program content portion 73, for example, the third ten minutes. The resultant content stream 45 featuring the joined program sections 71, 72, 73 also includes artifacts 77, 78 resulting from the splicing process. However, because the splicing has occurred at a boundary between two portions of program content, the artifacts appear in a program content portion of the resultant content stream 29. The resultant content stream 45 is delivered downstream to the TV sets, for example, TV set 21.

Figure 7:
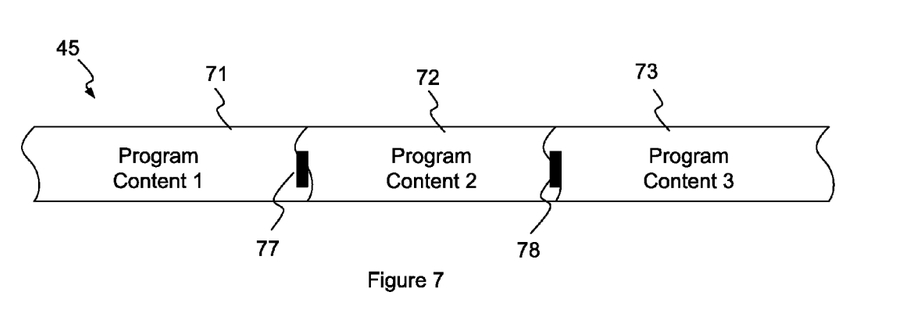
FIG. 7 represents a resultant program content stream after splicing the content streams of FIG. 6.
Figure 8:
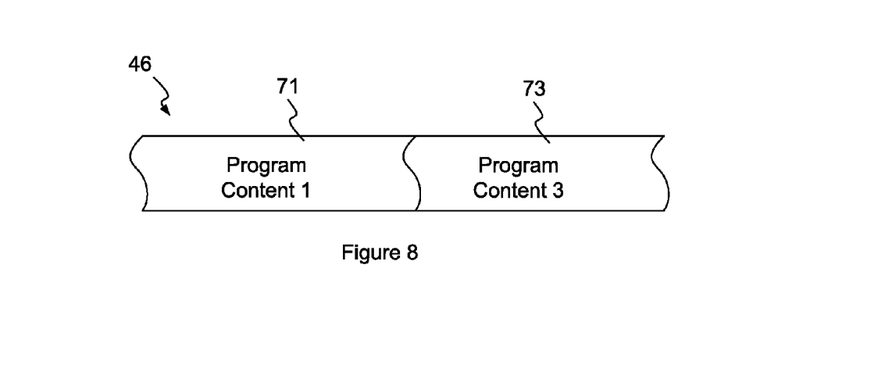
FIG. 8 represents a resultant program content stream after processing by a commercial remover.

When a commercial remover processes the resultant content stream 45 received through a set top box at a TV set 21, it encounters the artifacts 77, 78. The commercial remover considers artifact 77 to indicate the start of a commercial content portion and the artifact 78 to indicate the end of a commercial content portion. The commercial remover therefore removes the second program content portion 72 to produce a final content stream 46 (FIG. 8) having the first program content portion 71 followed immediately by the third program content portion 73. That is, the second program content portion 72 of the content stream 45 appears as a fake or spurious commercial which thwarts the commercial remover into falsely removing a desired portion of the program content. The viewer is presented with a program which is missing the second program content portion 72.

It is to be understood, that the resultant content stream 45 may or may not also include one or more commercial content portions which may or may not include detectable artifacts that can be processed by a commercial remover.

Figure 9:
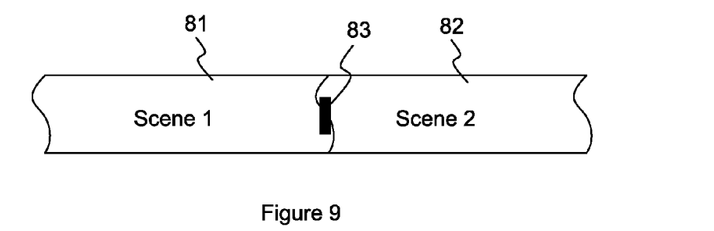
FIG. 9 represents a resultant content stream spliced at a boundary between scenes.

One way for a commercial remover to distinguish a fake commercial from a real commercial is to look at the frames immediately before and after the start and end of the commercial. The frame at the start of a real commercial is usually very different from the frame immediately before it. If a fake commercial is inserted in the middle of a scene, the frame at the start of the fake commercial would usually be almost the same as the frame immediately before it. Therefore, in accordance with an embodiment of the present invention shown in FIG. 9, a first portion of program content is spliced to a second portion of program content at the end of a scene 81 and start of a scene 82 in the program so that an artifact 83 occurs between scenes, thereby making the fake commercial appear more real to the commercial remover.

Figure 10:
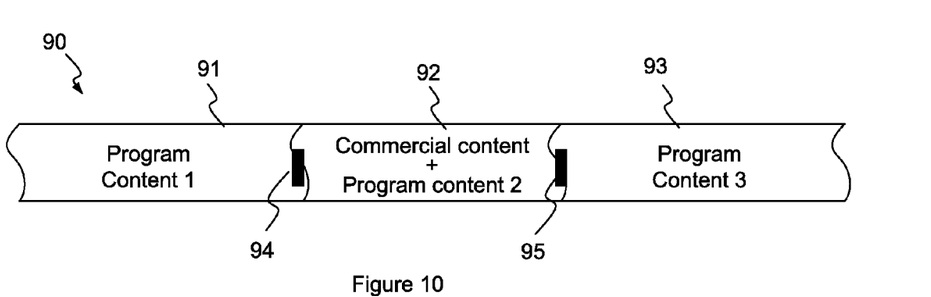
FIG. 10 represents a resultant content stream including a combined content portion.

Another way for a commercial remover to distinguish a fake commercial from a real commercial is to measure the time between an artifact indicating the start of a commercial and an artifact indicating the end of a commercial. Most real commercials are an even multiple of ten seconds long. Unfortunately, it may not be possible to have precise control over the length of a fake commercial. For example, if the first portion of program content is being spliced to the second portion of program content at the start or end of a scene, it is unlikely that the fake commercial will be an even multiple of ten seconds long. In accordance with an embodiment of the present invention, real commercials can be combined with fake or spurious commercials. In one example shown in FIG. 10, a second portion of a program content stream is added to the end of a commercial to produce a combined program portion 92, for example, a combined commercial having a non-standard length. The combined commercial is then spliced between first 91 and third 93 portions of program content to produce a resultant content stream 90. A commercial remover designed to remove only standard length commercials encounters the combined commercial 92 in the content stream 90, with the combined commercial appearing to have a non-standard length. The commercial remover therefore leaves the combined commercial, which includes the real commercial, in the content stream. With reference again to FIG. 5, the combined commercial can be pre-processed in multi-cast tree 40 so that the content stream 41 includes the combined commercial portion which is then spliced into the program content stream at node 15.

Figure 11:
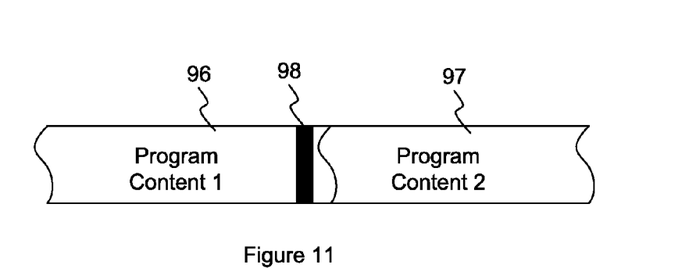
FIG. 11 represents a resultant content stream spliced at a fade to black boundary.

Another way for a commercial remover to distinguish a fake commercial from a real commercial is to look for the fades to black that are usually found at the beginning and ending of a string of real commercials. In order to thwart this commercial removal method, an embodiment of the present invention shown in FIG. 11 provides that a first portion of program content 96 is spliced to a second portion of program content 97 at a fade to black 98 in the program content stream so that any splicing artifacts coincide with a fade to black. The second portion of program content will therefore appear to the commercial remover as a commercial and will be inappropriately removed by the commercial remover.

Inserting spurious commercials makes it possible to use a wider variety of commercial insertion schemes because artifacts left by the splicing in of real commercials are indistinguishable from artifacts inserted when splicing in spurious or fake commercials. A commercial remover may inadvertently remove program portions while leaving in commercial content. The commercial remover therefore becomes unattractive for use by the viewer. Accordingly, the placement of commercial content into the program stream maintains its value for the network operator.

Furthermore, the wide variety of commercial insertion schemes supported by the present invention will include some schemes that may have advantages in terms of scalability and cost. It is to be understood that the present invention is not to be limited to any particular commercial insertion scheme.

While the invention describes the artifacts as being at the start and/or end of the spurious commercials, for example, at the point where the splicing occurs, artifacts may be introduced into the content stream at other locations in the content stream, provided.

The above described embodiments describe providing spurious commercials by splicing adjacent portions of program content together such that artifacts that imitate commercial content artifacts appear in the program portions of the content stream provided to the user. While the examples describe that adjacent portions are derived from different multicast trees, other methods and systems for splicing adjacent portions of program content would be apparent to the person skilled in the art. For example, a program content portion may be spliced out of the content stream at a node, in a similar manner to the way in which a commercial remover removes commercial content portions. The node then re-splices the removed content portion back into the content steam. The re-splicing step introduces artifacts into the program content portions of the content stream which then thwart the commercial remover. From the above, it will be apparent to the person skilled in the art that the artifacts may be introduced into the program portions of the content stream at any one or more points along the program network.

The present description and appended claims use terms and phrases such as first, second, third etc. It is to be understood by the person skilled in the art that unless otherwise stated explicitly, such terms are not intended to indicate a sequence. That is, a second program content portion may occur earlier in a program than a first program content portion.

While the invention has particular application to an IPTV network, the person skilled in the art will readily understand the applicability of the described embodiments to other network types.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method of processing program content, the method comprising:

processing a first program content stream to retrieve at least one of a first program content portion, a second program content portion and a third program content portion and processing a second content stream to retrieve any of the first program content portion, the second program content portion and the third program content portion not retrieved from the first program content stream;

splicing together the first program content stream and the second program content stream to combine the first program content portion, the second program content portion and the third program content portion;

creating at least one detectable artifact undetectable by a viewer of a program and placing the at least one detectable artifact in between the first program content portion and the second program content portion such that the at least one detectable artifact is contiguous with the first program content portion and contiguous with the second program content portion, wherein the at least one detectable artifact is placed during the splicing of the first program content stream and the second program content stream;

creating at least one additional detectable artifact undetectable by a viewer and placing the at least one additional detectable artifact in between the second program content portion and the third program content portion such that the at least one detectable artifact is contiguous with the second program content portion and contiguous with the third program content portion, wherein the placing the at least one additional artifact is performed during the splicing of the first program content stream and the second program content stream; and adding the second program content stream to an end of a commercial content portion and wherein both the second program content stream and the end of the commercial content portion are disposed after the detectable artifact and before the additional detectable artifact.

2. A method according to claim 1 wherein said first program content stream comprises the first program content portion and wherein the step of creating at least one detectable artifact comprises splicing the second program content portion from the second program content stream into said first program content stream.

3. A method according to claim 2 wherein the second program content portion is spliced into said first program content stream adjacent said first program content portion such that said at least one detectable artifact occurs at a boundary between said first and second program content portions and wherein the at least one detectable artifact does not interrupt the content delivered while transitioning from the first program content portion to the second program content portion.

4. A method according to claim 3 wherein the second program content portion is spliced into said first program content stream such that a boundary between said first program content portion and said second program portion substantially coincides with a change of scene in said program content.

5. A method according to claim 3 wherein the second program content portion is spliced into said first program content stream such that a boundary between said first program content portion and said second program content portion substantially coincides with a fade to black in said program content.

6. A method according to claim 1 wherein said second program content portion has a length that is a non-standard length for a commercial content portion of the first program content stream.

7. A method according to claim 1 wherein said at least one detectable artifact is created by splicing in the second program content portion.

8. A method according to claim 1 wherein said at least one detectable artifact is created by splicing out of the second program content portion.

9. The method of claim 1 wherein said at least one detectable artifact is not visible when the first program content stream is presented to a user.

10. The method of claim 1 wherein said at least one detectable artifact is not audible when the first program content stream is presented to a user.

11. The method of claim 2 further comprising
dividing the program content into the first program content stream comprising said first program content portion and the second program content stream comprising said second program content portion.

12. The method of claim 11 further comprising
combining said second program content portion with one or more commercial content portions.

13. The method of claim 11 further comprising
dividing said program content into said first program content portion and said second program content portion at a change of scene in said program content.

14. The method of claim 11 further comprising
dividing said program content into said first program content portion and said second program content portion at a fade to black in said program content.

15. The method of claim 1 wherein said at least one detectable artifact is detectable by a commercial remover.

16. A non-transitory computer readable device comprising memory for storing instructions that when executed by a processor perform processing program content, said instructions comprising:

instructions for processing a first program content stream to retrieve at least one of a first program content portion, a second program content portion and a third program content portion and processing a second content stream to retrieve any of the first program content portion, the second program content portion and the third program content portion not retrieved from the first program content stream;

instructions for splicing together the first program content stream and the second program content stream to combine the first program content portion, the second program content portion and the third program content portion;

instructions for creating at least one detectable artifact undetectable by a viewer of a program and placing the at least one detectable artifact in between the first program content portion and the second program content portion such that the at least one detectable artifact is contiguous with the first program content portion and contiguous with the second program content portion, wherein the at least one detectable artifact is placed during the splicing of the first program content stream and the second program content stream;

instructions for creating at least one additional detectable artifact undetectable by a viewer and placing the at least one additional detectable artifact in between the second program content portion and the third program content portion such that the at least one detectable artifact is contiguous with the second program content portion and contiguous with the third program content, wherein the placing the at least one additional artifact is performed during the splicing of the first program content stream and the second program content stream; and instructions for adding the second program content stream to an end of a commercial content portion and wherein both the second program content stream and the end of the commercial content portion are disposed after the detectable artifact and before the additional detectable artifact.

17. A memory storing instructions according to claim 16 further comprising instructions for dividing the program content into the first program content stream comprising said first program content portion and the second program content stream comprising said second program content portion.

18. A system for providing program content, the system comprising:
   at least one node; and
   a splicer at a first node of said at least one nodes, wherein said splicer receives a first program content stream containing a first program content portion and a second program content stream containing a second program content portion and a third program content stream containing a third program content portion, and wherein said splicer splices said first program content stream with said second program content stream and said third program content stream to create a resultant program content stream comprising the first program content portion, the second program content portion and the third program content portion,
   wherein said splicer splices said first program content portion contiguous with said second program content portion to create a joined program content portion containing at least one detectable artifact, such that the at least one detectable artifact is contiguous with the first program content portion and contiguous with the second program content portion, and wherein the at least one detectable artifact is created during the splicing of the first program content stream and the second program content stream, and
   wherein said splicer creates at least one additional detectable artifact undetectable by a viewer and places the at least one additional detectable artifact in between the second program content portion of said first program content stream and a third program content of said third program content stream such that the at least one detectable artifact is contiguous with the second program content portion and contiguous with the third program content portion,
   wherein the at least one detectable artifact and the at least one additional artifact are placed during the splicing operation of the first program content stream and the second program content stream, and
   wherein the second program content stream is added to an end of a commercial content portion and wherein both the second program content stream and the end of the commercial content portion are disposed after the detectable artifact and before the additional detectable artifact.

19. The system according to claim 18 wherein said at least one detectable artifact is undetectable by a user when said resultant content stream is presented to the user and wherein said at least one detectable artifact is detectable by a commercial remover.

20. The system according to claim 19 wherein said at least one detectable artifact causes a commercial remover to remove a program content portion from said resultant program content stream.

21. The system according to claim 19, wherein said at least one detectable artifact causes said commercial remover to leave said commercial content portion in said resultant program content stream.

22. The system according to claim 18 further comprising a second node, said second node dividing the program content into the first program content stream containing said first program content portion and the second program content stream comprising said second program content portion.

* * * * *